Patented Mar. 4, 1952

2,587,600

UNITED STATES PATENT OFFICE 2,587,600

PURIFICATION OF RUTIN

James F. Couch, Glenside, and Charles F. Krewson, Erdenheim, Philadelphia, Pa., assignors to the United States of America as represented by the Secretary of Agriculture No Drawing. Application July 23, 1948,
Serial No. 40,418

16 Claims. (Cl. 260—210)

(Granted under the act of March 3, 1883, as
amended April 30, 1928; 370 O. G. 757)

This application is made under the act of March 3, 1883, as amended by the act of April 30, 1928, and the invention herein described and claimed if patented in any country, may be manufactured and used by or for the Government of the United States of America throughout the world for governmental purposes without the payment to us of any royalty thereon.

This invention relates to the production of rutin. It particularly relates to a method for producing rutin free from odoriferous impurities from buckwheat.

Rutin, a glucoside of the flavonol group, occurs in a wide variety of plants and can be isolated from the rutin-bearing plant tissues by extraction with water at elevated temperature, or with organic solvents capable of dissolving rutin, such as various alcohols and ketones. The crude rutin so obtained, and especially rutin prepared by hot water extraction of plant material such as buckwheat, frequently contains certain extraneous substances of undetermined nature, which even when present in minute amounts, impart to refined rutin preparations either following the purification process or on subsequent storage of the purified product, a strong and objectionable odor. These odor imparting impurities cannot be eliminated by the usual purification methods utilized in the production of refined rutin, such as repeated crystallization from suitable organic solvents, and treatment of rutin solutions with inert adsorbent agents such as silica gel, activated alumina, infusorial earth, or activated charcoal, as described by Couch, Krewson, and Porter in their application for Patent Serial No. 685,632, now Patent No. 2,500,930. When these purification procedures are applied to rutin containing odor imparting impurities, the objectionable odor of the material treated is not materially decreased as a result of the purification treatment, and the product obtained, although essentially free of all other impurities usually present in crude rutin, is not suitable for therapeutic use.

We have found that the odor imparting impurities can be removed from rutin by contacting rutin, preferably free of substantially all other impurities, for a relatively prolonged period and preferably at a temperature above ordinary room temperature with a substantially water immiscible inert organic solvent in which the rutin is insoluble or only slightly soluble. Suitable solvents include hydrocarbons such as benzene, chlorinated hydrocarbons such as chloroform, and other water immiscible liquids which do not dissolve rutin, such as diethyl ether. The objectionable odor of purified rutin preparations containing the odor imparting admixtures is not decreased to any appreciable extent on exposing the thus contaminated rutin to the action of a solvent of the aforementioned type, for a relatively short period of time, for instance on elutriation with the solvent. However, we have discovered that the odor imparting impurities are completely removed on maintaining the material treated in contact with the solvent, preferably at elevated temperature below the decomposition temperature of rutin, for a length of time sufficient to form an extract containing substantially all of these impurities dispersed in the solvent. Usually it is advantageous to effect the extraction by percolation.

The following examples illustrate the purification process.

Example I

A 25 g. sample of oven-dried, refined rutin, isolated and purified according to the procedure described by Eskew et al., U. S. Department of Agriculture, Bureau of Agricultural and Industrial Chemistry Processed Circular AIC-114 and having a strong objectionable odor, was placed in a Soxhlet apparatus and extracted with boiling benzene, until free of odor which required about 16 hours. The extracted rutin was dried at 110° C. to constant weight and stored in a sealed bottle for three months, at which time the rutin had only the faintest trace of odor. The benzene extract was evaporated to dryness, yielding 0.03 g. of a dark colored, oily residue having a strong acrid odor.

Example II

The procedure described in the foregoing example was repeated using boiling chloroform as the solvent. The extracted rutin was completely odorless and 0.03 g. of a dark brown oily residue, similar to that described in Example I, was obtained on evaporation of the solvent.

Example III

The procedure described in Example I was repeated using boiling ethyl-ether as the solvent. The extracted rutin was completely odorless. The residue obtained on evaporation of the extract to dryness, weighed 0.03 g. and consisted of a light yellowish-green oily material having a strong, pungent odor.

The process described in said Circular AIC-114 is summarized as follows:

In the hot-water extraction process, buckwheat leaf meal is given three 20-minute extractions in boiling water to remove the rutin. This recovers approximately 97 percent of the rutin. After the extracts are filtered, they are concentrated by vacuum exaporation. Proteins and colloidal materials are coagulated by adding an equal volume of 95 percent ethyl alcohol to the concentrates. The curd so formed is removed by filtration; the filtrate is evaporated with addition of water until practically all the alcohol is driven off. This water solution is permitted to crystallize, and the crude rutin is filtered off. A recrystallization is then given. If traces of alcohol-insolubles are objectionable in the finished rutin, they may be removed at this point by dissolving the rutin in a small amount of hot alcohol and filtering; thereafter in a vacuum evaporation step the alcohol is replaced by water. A third and final crystallization is then given to insure the desired purity, after which the crystals are filtered off and dried.

Results similar to those described in the foregoing examples can also be attained by steeping the impure rutin in the hot solvent for a considerable length of time without any distillation of volatiles.

Having thus described our invention, we claim:

1. In a process of preparing rutin from buckwheat in which buckwheat leaf meal is extracted with water, impurities coagulated with alcohol, and the coagulant removed, and rutin crystallized from solution; the improvement comprising removing the odoriferous impurities by thereafter extracting the rutin with boiling benzene for about sixteen hours.

2. In a process of preparing rutin from buckwheat in which buckwheat leaf meal is extracted with water, impurities coagulated with alcohol, and the coagulant removed; the improvement comprising removing the odoriferous impurities by thereafter extracting the rutin by percolation in contact with hot boiling water-immiscible organic liquid solvent which is inert to rutin and in which rutin is substantially insoluble and which is taken from the group consisting of benzene, chloroform, and diethyl ether at a temperature below the decomposition temperature of rutin for at least several hours and for a length of time sufficient to form an extract containing the odoriferous impurities disposed in the solvent.

3. A process of removing odor imparting impurities from rutin, comprising extracting the rutin, which has been substantially freed of all other impurities by repeated crystallization from organic solvents and treatment of rutin solution with adsorbent agents, with a hot water-immiscible organic liquid solvent which is inert to rutin and in which rutin is substantially insoluble and which is taken from the group consisting of benzene, chloroform, and diethyl ether, for several hours, whereby an extract is formed containing the odoriferous impurities disposed in the solvent.

4. The process of claim 3 in which the extracting is by percolation.

5. In a process of preparing rutin from buckwheat in which buckwheat leaf meal is extracted with water, impurities coagulated with alcohol and the coagulant removed, and rutin crystallized from solution, the improvement comprising removing the odor imparting impurities by thereafter treating the rutin with a hot boiling water-immiscible organic solvent which is inert to rutin and in which rutin is substantially insoluble, taken from the group consisting of benzene, chloroform, and diethyl ether, at a temperature below the decomposition temperature of rutin, for a length of time sufficient to deodorize the rutin and to form an extract containing the odoriferous impurities disposed in the solvent, being several hours.

6. The process of claim 5 in which the solvent is diethyl ether.

7. In a process of preparing rutin from buckwheat in which buckwheat leaf meal is extracted with water, impurities coagulated with alcohol and the coagulant removed, and rutin crystallized from solution, the improvement comprising removing the odor imparting impurities by thereafter treating the rutin with hot boiling benzene, at a temperature below the decomposition temperature of rutin, for a length of time sufficient to deodorize the rutin to form an extract containing the odoriferous impurities disposed in the benzene, being several hours.

8. In a process of preparing rutin from buckwheat in which buckwheat leaf meal is extracted with water, impurities coagulated with alcohol and the coagulant removed, and rutin crystallized from solution, the improvement comprising removing the odor imparting impurities by thereafter treating the rutin with hot boiling chloroform, at a temperature below the decomposition temperature of rutin, for a length of time sufficient to deodorize the rutin to form an extract containing the odoriferous impurities disposed in the chloroform, being several hours.

9. In a process of preparing rutin from buckwheat in which buckwheat leaf meal is extracted with water, impurities coagulated with alcohol and the coagulant removed, the improvement comprising removing the odor imparting impurities by thereafter extracting the rutin by percolation in contact with hot boiling benzene at a temperature below the decomposition temperature of rutin for at least several hours and for a length of time sufficient to form an extract containing the odoriferous impurities disposed in the benzene.

10. In a process of preparing rutin from buckwheat in which buckwheat leaf meal is extracted with water, impurities coagulated with alcohol, and the coagulant removed; the improvement comprising removing the odor imparting impurities by thereafter extracting the rutin by percolation in contact with hot boiling diethyl ether at a temperature below the decomposition temperature of rutin for at least several hours and for a length of time sufficient to form an extract containing the odoriferous impurities disposed in the diethyl ether.

11. In a process of preparing rutin from buckwheat in which buckwheat leaf meal is extracted with water, impurities coagulated with alcohol, and the coagulant removed; the improvement comprising removing the odor imparting impurities by thereafter extracting the rutin by percolation in contact with hot boiling chloroform at a temperature below the decomposition temperature of rutin for at least several hours and for a length of time sufficient to form an extract containing the odoriferous impurities disposed in the chloroform.

12. The process of purifying rutin derived by extraction of buckwheat with hot water and subsequent partial removal of impurities, which comprises contacting the partially purified rutin containing odor imparting impurities with an inert, water immiscible hot liquid organic solvent in which rutin is substantially insoluble, taken from the group consisting of benzene, chloroform, and di-ethyl ether, at a temperature below the decomposition temperature of rutin for a length of time sufficient to form an extract containing the said impurities disposed in the solvent, being at least several hours, the odor imparting impurities being such as cannot be eliminated from the rutin by ordinary repeated crystallization from organic solvents, and usual treatment of rutin solutions with silica gel, activated alumina, infusorial earth, and activated charcoal.

13. The process of claim 12 in which the solvent is boiling benzene.

14. The process of claim 12 in which the solvent is boiling chloroform.

15. The process of claim 12 in which the solvent is boiling di-ethyl ether.

16. The process of claim 12 in which the contacting is by percolation.

JAMES F. COUCH.
CHARLES F. KREWSON.

REFERENCES CITED

The following references are of record in the file of this patent:

UNITED STATES PATENTS

| Number | Name | Date |
|---|---|---|
| 2,107,796 | MacDonald | Feb. 8, 1938 |
| 2,498,849 | Charney | Feb. 28, 1950 |
| 2,520,127 | Couch et al. | Aug. 29, 1950 |

OTHER REFERENCES

Eskew et al., Dept. of Agri., Bur. of Agri. and Ind. Chem. Processed Circular AIC–114, April 1946, pages 15, 16, 2 pages.

Sando et al., J. Biol. Chem. V. 41 (1920), page 496, 1 page.